United States Patent
Saint-Jalmes (10) Patent No.: US 7,252,268 B2
(45) Date of Patent: Aug. 7, 2007

(54) INTERIOR CONFIGURATION FOR AN AIRCRAFT CABIN

(75) Inventor: Bruno Saint-Jalmes, Toulouse (FR)

(73) Assignee: Airbus, Blagnac (FR)

( * ) Notice: Subject to any disclaimer, the term of this patent is extended or adjusted under 35 U.S.C. 154(b) by 0 days.

(21) Appl. No.: 10/477,705

(22) PCT Filed: Aug. 21, 2003

(86) PCT No.: PCT/FR02/02558

§ 371 (c)(1),
(2), (4) Date: Aug. 23, 2004

(87) PCT Pub. No.: WO2004/018290

PCT Pub. Date: Mar. 4, 2004

(65) Prior Publication Data

US 2005/0001098 A1 Jan. 6, 2005

(30) Foreign Application Priority Data

Aug. 23, 2002 (FR) .................................. 02 10512

(51) Int. Cl.
*B64D 11/06* (2006.01)
(52) U.S. Cl. .................................................. 244/118.6
(58) Field of Classification Search ............. 244/118.5, 244/118.6, 122 R, 122 AH, 118.1, 118.2, 244/119, 120, 121; 144/118–195; 105/322, 105/345–347; 297/63, 64, 65.05, 69, 245, 297/248, 232, 243, 244, 217.7; 446/482; 114/118–195; 296/63, 64, 69, 65.05
See application file for complete search history.

(56) References Cited

U.S. PATENT DOCUMENTS 824,393 A * 6/1906 Vogel ......................... 105/345

| 1,780,938 | A | * | 11/1930 | Passis | 362/131 |
|---|---|---|---|---|---|
| 1,787,245 | A | * | 12/1930 | Graham et al. | 297/125 |
| 1,998,697 | A | * | 4/1935 | Austin | 296/64 |
| 2,124,003 | A | | 7/1938 | Helwig et al. | |
| 2,364,595 | A | * | 12/1944 | Tully et al. | 105/315 |
| 2,382,402 | A | * | 8/1945 | De Roode | 244/118.6 |
| D155,335 | S | * | 9/1949 | Delcher | D12/195 |
| D155,777 | S | * | 11/1949 | Butler | D12/195 |

(Continued)

FOREIGN PATENT DOCUMENTS

| EP | 0 980 825 | 2/2000 |
|---|---|---|
| GB | 327 899 | 4/1930 |
| WO | 96 18537 | 6/1996 |

OTHER PUBLICATIONS

Dornheim M A:"Dassault's Falcon 2000: New Big Cabin Twinjet", Aviation Week and Space Technology, vol. 138, No. 13, pp. 42-44,45, Mar. 29, 1993.
U.S. Appl. No. 10/477,705, filed Nov. 14, 2003, Saint-Jalmes.
U.S. Appl. No. 10/485,735, filed Feb. 4, 2004, Saint-Jalmes.

*Primary Examiner*—Teri Pham Luu
*Assistant Examiner*—Stephen A Holzsen
(74) *Attorney, Agent, or Firm*—Oblon, Spivak, McClelland, Maier & Neustadt, P.C.

(57) ABSTRACT

An interior layout of an aircraft cabin including a set of aircraft seats arranged in the aircraft cabin. Each set includes two rows of seats arranged transversely in relation to the longitudinal axis of the cabin in which they are located and a single longitudinal aisle allows access to the transverse rows. The two transverse rows are arranged opposite one another and a transverse aisle separates the two rows of seats. In each row of seats, at least one seat is located on one side of the longitudinal aisle and at least two seats are located on the other side of the longitudinal aisle.

22 Claims, 6 Drawing Sheets

U.S. PATENT DOCUMENTS

| | | | | |
|---|---|---|---|---|
| 2,545,523 | A | * | 3/1951 | Loewy .................... 105/315 |
| 2,595,607 | A | * | 5/1952 | Priebe .................... 244/118.6 |
| 2,608,366 | A | * | 8/1952 | Jergenson ............... 244/118.6 |
| 2,844,109 | A | * | 7/1958 | Austgen et al. ............ 105/321 |
| 2,859,803 | A | * | 11/1958 | McCallister ............... 297/245 |
| 2,947,349 | A | * | 8/1960 | Kryter .................... 297/174 R |
| 3,020,087 | A | * | 2/1962 | Macklin ................... 297/244 |
| 3,379,471 | A | * | 4/1968 | Dalziel ..................... 297/92 |
| 3,455,597 | A | * | 7/1969 | Sherbert et al. ............. 296/64 |
| 3,730,583 | A | * | 5/1973 | Colovas et al. .............. 296/64 |
| 3,784,989 | A | * | 1/1974 | LeGrand ..................... 5/9.1 |
| 4,228,745 | A | * | 10/1980 | Gale ...................... 108/116 |
| 4,686,908 | A | * | 8/1987 | Legrand ................... 105/315 |
| 4,850,642 | A | * | 7/1989 | Crowe .................... 297/452.18 |
| 4,936,620 | A | * | 6/1990 | Francois et al. ............ 296/64 |
| 4,951,560 | A | * | 8/1990 | Setan ..................... 105/340 |
| 5,024,398 | A | * | 6/1991 | Riedinger et al. ........ 244/118.5 |
| 5,026,006 | A | * | 6/1991 | Tinder et al. ........ 244/122 AG |
| 5,083,838 | A | * | 1/1992 | Maxwell, Jr. ............... 297/244 |
| 5,647,658 | A | * | 7/1997 | Ziadi ..................... 362/471 |
| 5,716,026 | A | * | 2/1998 | Pascasio et al. .......... 244/118.6 |
| 5,740,989 | A | * | 4/1998 | Daines ................... 244/118.6 |
| 5,857,745 | A | * | 1/1999 | Matsumiya ............ 297/354.13 |
| 5,947,541 | A | * | 9/1999 | Behrens et al. .............. 296/64 |
| 6,000,659 | A | * | 12/1999 | Brauer ................... 244/118.6 |
| RE36,642 | E | * | 4/2000 | Ziadi ..................... 362/471 |
| 6,059,364 | A | * | 5/2000 | Dryburgh et al. ...... 297/354.13 |
| 6,119,980 | A | * | 9/2000 | Ferry .................... 244/122 R |
| 6,173,921 | B1 | * | 1/2001 | Neumann et al. ........ 244/118.6 |
| D439,063 | S | * | 3/2001 | Round et al. ............... D6/356 |
| 6,209,956 | B1 | * | 4/2001 | Dryburgh et al. ........... 297/245 |
| 6,227,489 | B1 | * | 5/2001 | Kitamoto et al. ........ 244/118.5 |
| 6,237,872 | B1 | * | 5/2001 | Bar-Levav ............... 244/118.6 |
| 6,669,141 | B2 | * | 12/2003 | Schmidt-Schaeffer .... 244/118.6 |
| 6,692,069 | B2 | * | 2/2004 | Beroth et al. .............. 297/118 |
| 6,715,716 | B1 | * | 4/2004 | Cheung ................... 244/118.6 |
| 6,766,986 | B2 | * | 7/2004 | Konya .................... 244/137.2 |
| 6,816,087 | B2 | * | 11/2004 | Lane ........................ 340/945 |
| 6,874,731 | B1 | * | 4/2005 | Brauer et al. ............ 244/118.5 |
| 2001/0003962 | A1 | * | 6/2001 | Park et al. ................. 108/140 |
| 2002/0017810 | A1 | * | 2/2002 | Dryburgh et al. ...... 297/354.13 |
| 2002/0070314 | A1 | * | 6/2002 | Schmidt-Schaeffer .... 244/118.6 |
| 2003/0071507 | A1 | * | 4/2003 | Sankrithi ................ 297/411.21 |
| 2003/0098391 | A1 | * | 5/2003 | Sankrithi et al. ......... 244/118.6 |
| 2003/0218095 | A1 | * | 11/2003 | Saint Jalmes ............ 244/118.5 |
| 2004/0016845 | A1 | * | 1/2004 | Nelson ..................... 244/45 A |
| 2004/0094668 | A1 | * | 5/2004 | Jarosz ..................... 244/118.5 |
| 2004/0195451 | A1 | * | 10/2004 | Bentley et al. .......... 244/118.6 |
| 2004/0232283 | A1 | * | 11/2004 | Ferry et al. .............. 244/118.6 |
| 2005/0001097 | A1 | * | 1/2005 | Saint-Jalmes ............ 244/118.6 |
| 2005/0001098 | A1 | * | 1/2005 | Saint-Jalmes ............ 244/118.6 |
| 2005/0023413 | A1 | * | 2/2005 | Saint-Jalmes ............ 244/118.6 |
| 2005/0087650 | A1 | * | 4/2005 | Quan et al. .............. 244/118.6 |
| 2006/0273222 | A1 | * | 12/2006 | Saint-Jalmes et al. ... 244/118.6 |

* cited by examiner

INTERIOR CONFIGURATION FOR AN AIRCRAFT CABIN

This invention relates to an interior layout of a cabin of an aircraft such as an airplane, for example. It relates more particularly to a series of seats, possibly convertible to beds, arranged inside an aircraft cabin.

In order to attract more passengers, the airline companies have a tendency to increase the comfort offered to the passengers during an airplane trip. In general, this increase in comfort means that a larger private space is set aside for each passenger. To meet the demands of the clientele, it is even known to put in a partition around a seat to separate the passenger sitting on this seat from the neighboring passengers. The document WO-96/18537 thus shows such a seat combined with such a partition.

Such modules for passengers have been known for equipping luxury spaces, also called "first class" spaces. In order to be able also to adapt these modules to less luxurious spaces, usually designated as "business class" spaces, it has been proposed in document WO-00/21831 to combine in a particular manner two modules such as the one described in document WO-96/18537 in a special way in order to save room and thus place a greater number of modules in a given space of an aircraft cabin.

This invention then has the purpose of providing a combination of seats equipped or not equipped with a partition, which makes it possible to optimize the space available in an aircraft cabin for housing the greatest possible number of seats. When these seats are equipped with a partition at least partially surrounding them, this invention also has the purpose of providing an optimal form of this partition suitable for the arrangement of the seats according to the invention.

To this end, it proposes a series of aircraft seats in an aircraft cabin comprising two rows of seats arranged transversely in relation to the longitudinal axis of the cabin in which they are located, a single longitudinal aisle permitting access to the transverse rows.

According to the invention, the two transverse rows are arranged opposite one another, a transverse aisle separates the two rows of seats, and in each row of seats at least one seat is on one side of the longitudinal aisle and at least two seats are on the other side of the longitudinal aisle.

This series of seats makes it possible to optimize the available space in an aircraft cabin, being capable of accommodating passengers at least three abreast. It suffices to arrange next to each other as many series of seats such as defined hereinabove as needed to lay out a section of an aircraft cabin. If room is still available, but not enough for a series of seats, arranging a row of seats in the remaining available space possibly may be considered as well. The seats in such a series are easily accessible to the passengers. Thus a passenger can access his seat or leave it without having to disturb a neighboring passenger. A series of seats according to this invention therefore makes it possible, with a single longitudinal aisle, to have this advantage for the passengers to be able to move about freely without having to apologize to one or more neighboring passengers. Finally, the use of series of seats according to the invention for the interior layout of an aircraft cabin makes it possible to facilitate traffic inside this cabin. As a matter of fact, by virtue of the transverse aisles it becomes possible to pass others in the longitudinal aisle without difficulty. A person can "move aside" in a transverse aisle without disturbing the seated passengers, allow another person in the longitudinal aisle to pass, and start moving again once the other person has passed.

Each seat preferably is positioned parallel to the axis of the longitudinal aisle. Thus all the seats of the series are identical and each seat is accessed in the same manner, irrespective of the position of the seat in its row.

A series of aircraft seats according to the invention is well suited to the case in which each seat is combined with an appurtenance arranged facing and at a distance from the seat, with a width less than that of the seat. This appurtenance first of all makes it possible to increase the comfort of the passenger and then it distinguishes the private space intended for the passenger from the collective space (here the transverse aisle) provided for traffic. This appurtenance can be simply a footrest and/or a baggage compartment. It also can be, for example, a unit incorporating a television screen to allow the passenger to view a film. It is advantageously provided that the appurtenance comprises a support surface arranged at a height more or less equal to that of the sitting surface of the seat, within about ten centimeters. This support surface then can serve, for example, to accommodate a visitor. It also may be provided that each seat cooperates with the appurtenance arranged facing it to make a bedding surface. The support surface then may serve as a bed end.

In one embodiment, each seat of a series according to the invention comprises a sitting surface, a back and two armrests, and the seat is surrounded on its back and armrest side by a lateral wall serving as a divider with a neighboring seat. In this way a divider isolating the passenger from the neighboring passengers is implemented for each passenger.

In the case in which an appurtenance is provided facing each seat, a preferred embodiment provides that each seat comprises a sitting surface, a back and two armrests, that a lateral wall surrounds each seat on the back and armrest side thereof, as well as the appurtenance combined with the seat, and that at least one opening is provided in the lateral wall in order to access the seat. Each passenger then enjoys a private module, consisting of the seat, the appurtenance and the lateral wall which completely delimits the space which is intended for him, while isolating him from the other passengers.

In this preferred configuration, each appurtenance can be more or less centered on the longitudinal axis of the corresponding seat, and each lateral wall then preferably has an opening between the seat and the appurtenance on each of its sides situated facing a neighboring seat. In this embodiment, all the seats can be identical if it is provided that each lateral wall has two openings of identical width, one on each side of the corresponding seat, and a door is provided for closing one or the other of the openings.

In this same configuration in which a lateral wall each time surrounds a seat and the corresponding appurtenance, it also may be provided that the lateral wall comprises a first side more or less parallel to the longitudinal aisle, that the seat and the appurtenance are arranged against this first side, that a second side of the wall, opposite the first side, widens out in relation to this first side starting from the appurtenance, and that the opening for accessing the seat is implemented in the second side. This embodiment makes it possible to optimize access to the seats. The width of the access thus is as large as possible, which of course contributes to the greater comfort of the passengers. In this embodiment there are two types of seats: a first type of seats for which the first side of the lateral wall, the one which is more or less parallel to the longitudinal aisle, is to the right of a passenger sitting on the seat, and a second type of seats for which the first side of the wall is to the left of a passenger sitting on the seat. The seats then preferably are arranged so that for the seats situated near a cabin wall, the first side of the corresponding wall faces the cabin wall, and in a transverse row of seats, between the cabin wall and the longitudinal aisle, the types of seats alternate from one seat to the other.

This invention also relates to an aircraft, characterized in that it comprises at least one set of seats such as described previously.

Other details and advantages of this invention will emerge from the description which follows, presented with reference to the attached schematic drawing, in which.

FIGS. 1 to 14 of the drawing each schematically depict an airplane cabin section. In standard manner, this airplane cabin section is implemented in a fuselage of generally circular cylindrical shape. This cabin section thus has a longitudinal axis 2 which corresponds more or less to the axis of revolution of the fuselage. The direction of movement of the airplane in flight is indicated by the arrow 4. The cabin of the airplane has a cabin wall 6 schematized without thickness merely by a line, as well as a floor on which the seats intended to accommodate passengers are fastened.

Emergency exits (not depicted) are arranged in the cabin in accordance with regulations to make possible a rapid evacuation of the passengers in this cabin in the event of need. The Figures in the drawing depict, for example, a cabin section arranged between two emergency exits which follow one another longitudinally in the direction of the airplane. Each Figure depicts an arrangement of seats in the airplane cabin so as to be able to seat the greatest number of passengers in the cabin section under consideration, while assuring them of substantial comfort.

In all the Figures, it was considered that each passenger had a seat 8 equipped, in standard manner, with a sitting surface, a back and two armrests. Facing this seat, and at a distance from the latter, there is situated each time an appurtenance 10 which can be, for example, a baggage compartment, a shelf, a footrest, or even a box incorporating, for example, a television screen. This appurtenance preferably comprises a support surface situated more or less (within 20 cm for example) at the same height as the sitting surface of the corresponding seat 8. If the seat then is a convertible seat, it can cooperate with this support surface to make a bedding surface forming a bed for the passenger. This bed then has a stationary portion. This then makes it possible to limit the moving parts of the convertible seat. The overall bulk of the bed formed in this manner can be reduced.

Each appurtenance 10 is of a width less than the seat. In addition, if one considers the plane of symmetry of a seat 8, depicted by an axis 12 in FIG. 1, the appurtenance 10 is more or less centered on this plane of symmetry.

In the examples of embodiment depicted in the drawing, the private space intended for each passenger is delimited by a lateral wall 14. This wall surrounds the seat on the side of the back and two armrests thereof and also surrounds the appurtenance 10. This lateral wall is, for example, higher on the side of the seat 8 than on the side of the appurtenance 10. By way of example, it may be considered, for example, that the walls have a height ranging between 0.60 m and 1.50 m. An opening is provided in each lateral wall 14 to allow access to the seat 8 located therewithin. This opening, of course, is implemented each time between the seat 8 and the appurtenance 10. Depending on the circumstances, and as explained hereinbelow, one or two openings is/are provided in the lateral wall 14.

Figure 15:
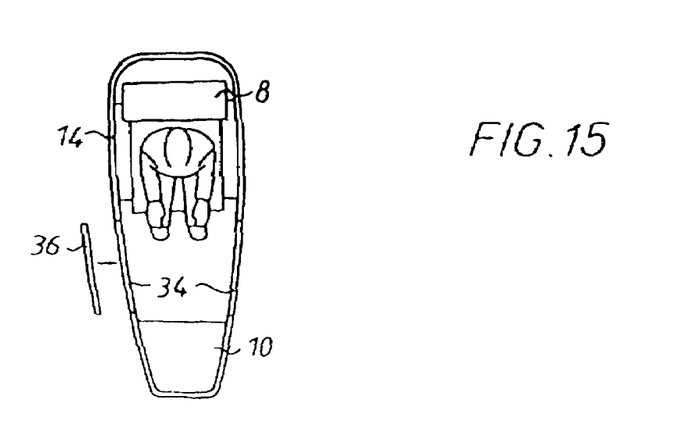
FIG. 15 shows, on an enlarged scale, a plan view of a seat such as those shown in FIG. 1 to 13.
Figure 16:
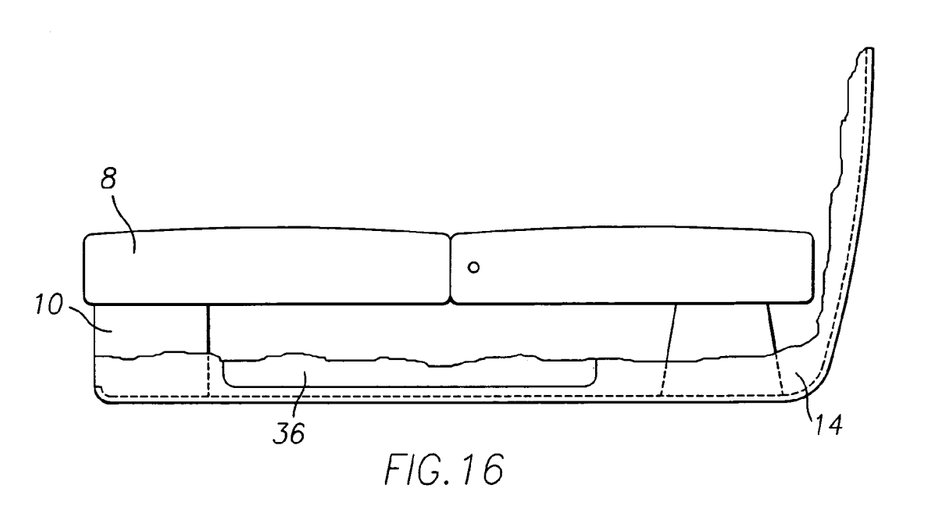
FIG. 16 shows, on an enlarged scale, a side view of a seat such as those shown in FIG. 1 to 13.

FIGS. 15 and 16 illustrate, on an enlarged scale, a module formed from a seat 8, its combined appurtenance 10 and a lateral wall 14. In order to have only identical modules, two openings 34 are provided in the lateral wall 14, each time one between the seat 8 and the appurtenance 10. These two openings 34 are identical and symmetrical. When the module is to comprise only one opening 34, the other opening then is closed by a door 36 as suggested by an arrow in FIG. 15. The same door 36, of course, also can close the other opening 34. Generally a single access to the module is required. Accordingly, therefore, each module generally is equipped with a door 36.

The fastening of the seats 8, the appurtenances 10 and the lateral walls 14 on the floor of the cabin is accomplished with the aid of fastening devices engaging in the longitudinal rails incorporated into the floor. Such rails are provided in standard manner in aircraft construction and nearly all the airplanes intended for the transport of passengers are equipped with them. These rails extend throughout the length of the cabin and generally have fastening points at regular intervals, for example every 2.54 cm (or 1 inch).

In the remainder of the specification, it is assumed for all the cabin sections described that they are equipped with modules comprising a seat 8, an appurtenance 10 and a lateral wall 14 as described hereinabove. Nonetheless, the invention also can be adapted in the case of single seats, possibly equipped with an appurtenance and/or a lateral wall. Of course, a second appurtenance, or an appurtenance arranged differently, can be combined with the seat without going beyond the context of the invention.

Figure 1:
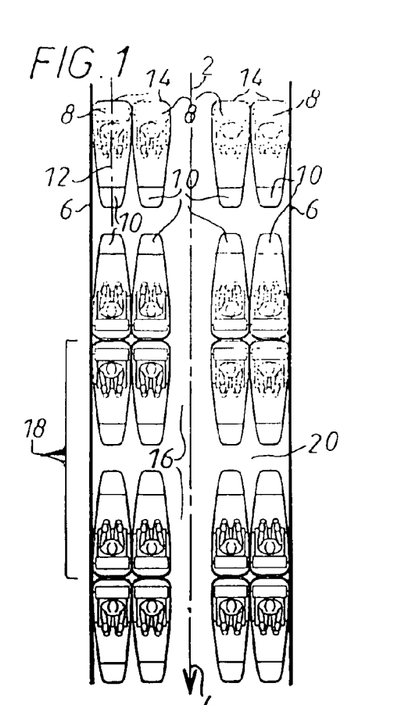
FIG. 1 shows sets of seats according to the invention in an aircraft cabin with four seats abreast.
Figure 2:
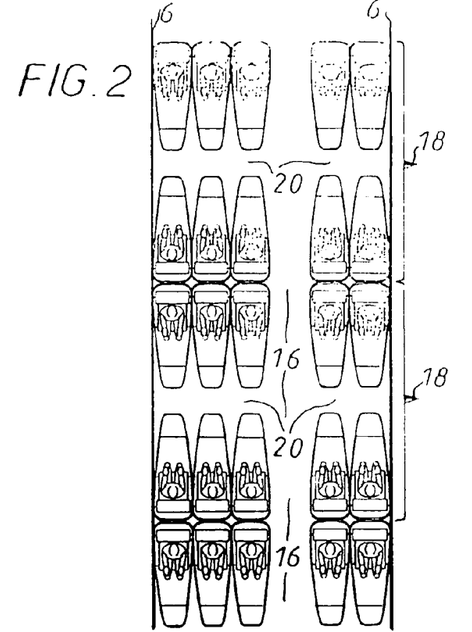
FIG. 2 depicts sets of seats according to the invention in an aircraft cabin with five seats abreast.
Figure 3:
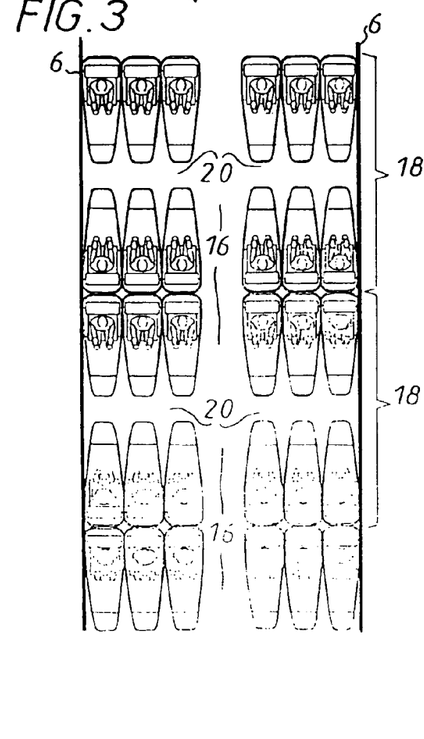
FIGS. 3 and 4 depict sets of seats according to the invention with six seats abreast.
Figure 4:
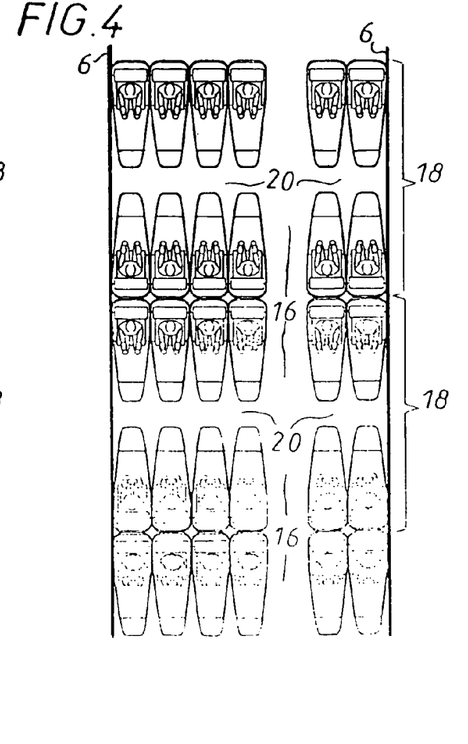
Figure 5:
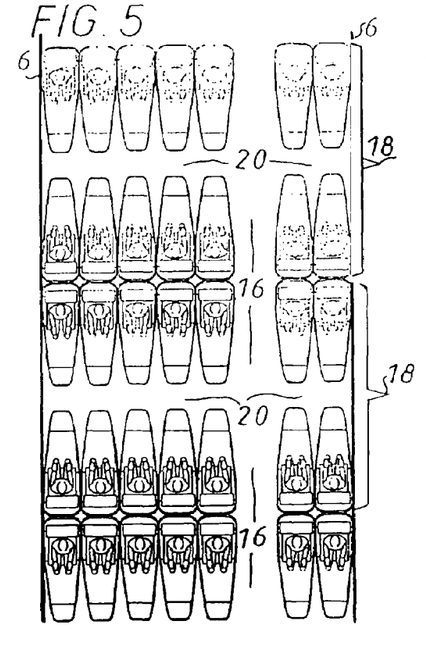
FIGS. 5 and 6 depict sets of seats according to the invention with seven seats abreast.
Figure 6:
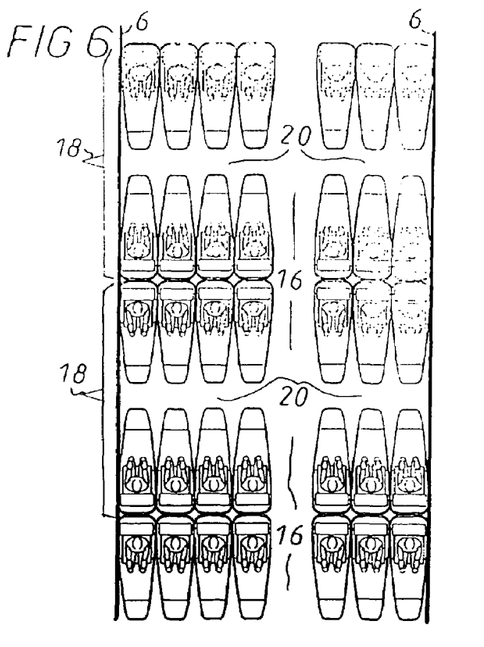
Figure 7:
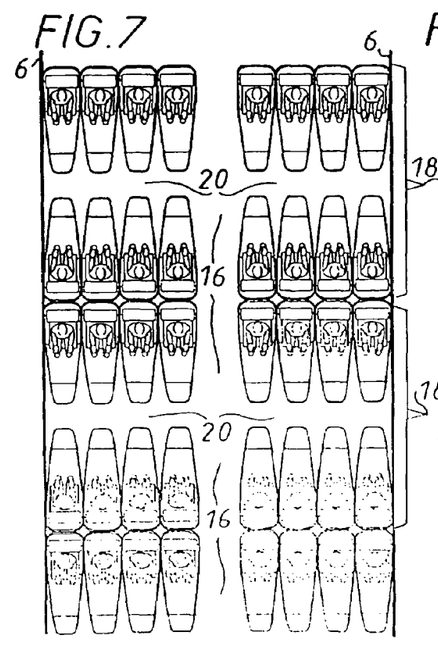
FIGS. 7 to 9 depict sets of seats according to the invention with eight seats abreast.
Figure 8:
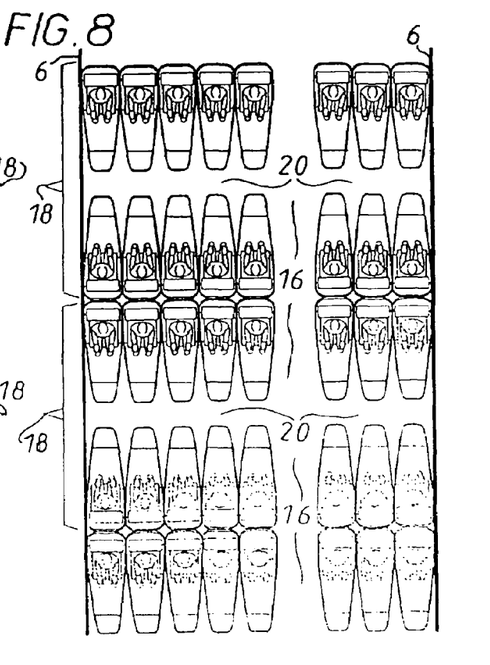
Figure 9:
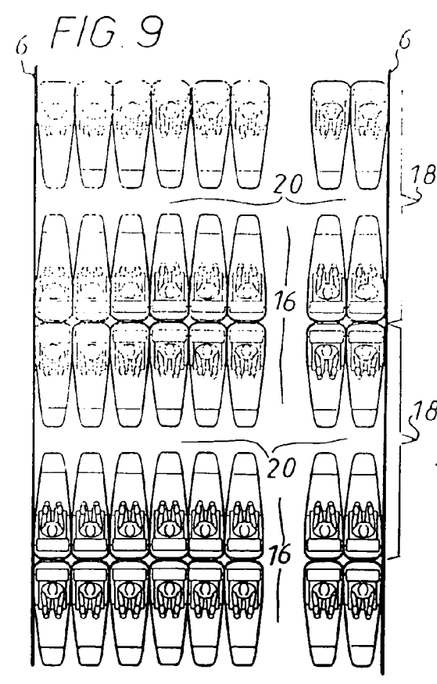
Figure 10:
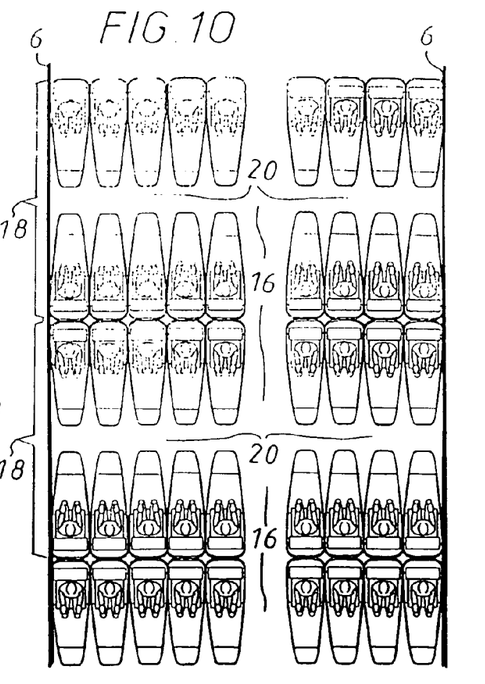
FIG. 10 depicts sets of seats according to the invention with nine seats abreast.
Figure 11:
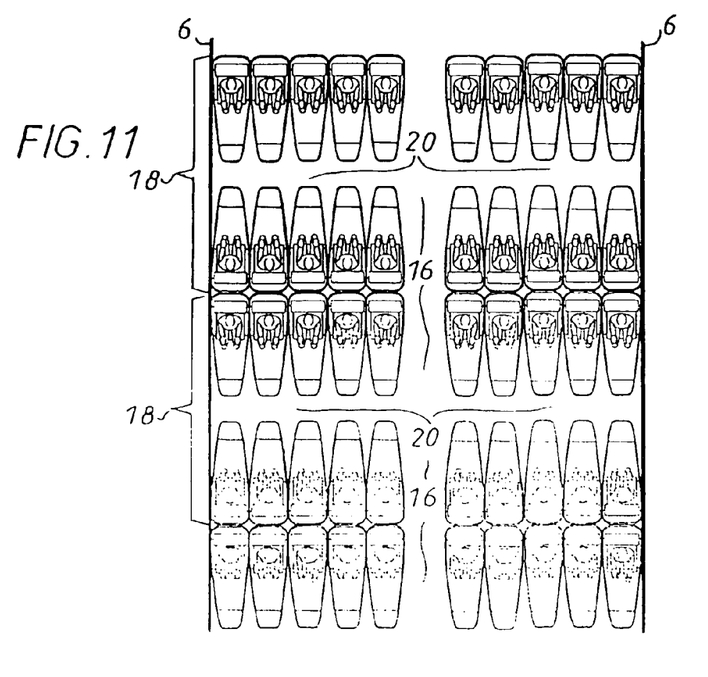
FIG. 11 depicts sets of seats according to the invention with ten seats abreast.
Figure 12:
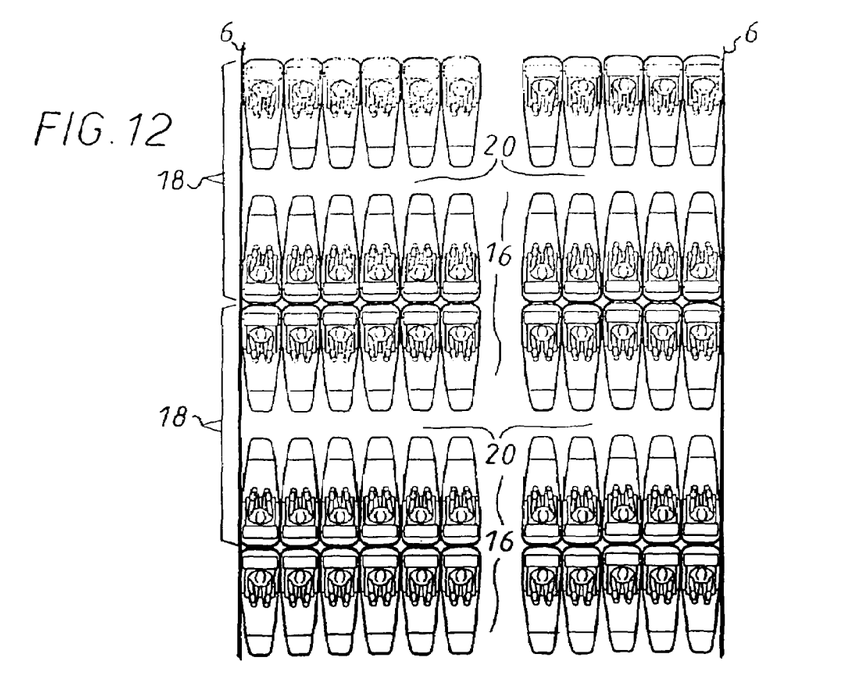
FIG. 12 depicts sets of seats according to the invention with eleven seats abreast.
Figure 13:
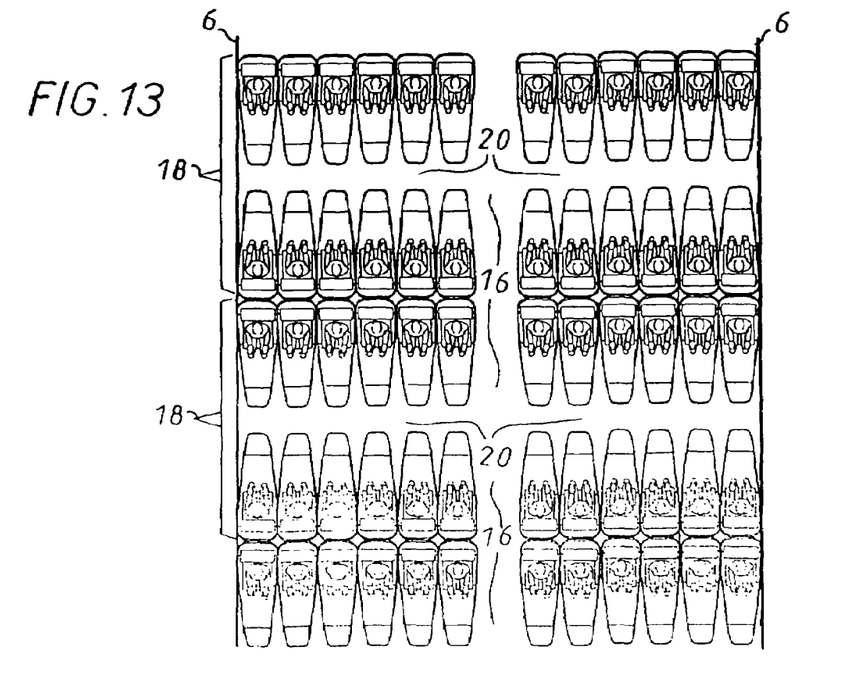
FIG. 13 depicts sets of seats according to the invention with twelve seats abreast.

FIG. 1 corresponds to an airplane the fuselage of which has a relatively small diameter. The presence of five rows of four seats 8 is noted on this Figure. To access each of these rows, a longitudinal aisle 16 is provided. This longitudinal aisle 16 divides each row of four seats into two half-rows of two seats.

It also is noted in FIG. 1 that the rows of seats, which are arranged transversely in relation to the longitudinal axis 2 of the airplane, are arranged so that the passengers in one row, when they are sitting in the corresponding seats, look in the opposite direction from the passengers sitting in the seats of the preceding or following row. Thus in a first row, the passengers sitting in the seats 8 look in the direction of movement of the airplane indicated by the arrow 4, while the passengers in the following row are sitting in the opposite direction and look toward the rear of the airplane, in the opposite direction from arrow 4. Thus, considering two successive rows, it is noted that the seats 8 of these rows are either back to back or face to face.

A set 18 of two rows, the seats of which are facing, is considered below. This set 18 has a transverse aisle 20 which separates the two rows of this set and which, of course, intersects the longitudinal aisle 16. This transverse aisle 20 in fact is an extension of the longitudinal aisle 16 in order to permit access to the seats of the set 18 which are not adjacent to the longitudinal aisle 16.

An access to the seats adjacent to the longitudinal aisle 16 can be provided either directly from this longitudinal aisle 16 or only from transverse aisle 20. In the first case, each lateral wall 14 of the corresponding seats 8 then has an opening on the side with the longitudinal aisle 16. An opening also can be provided for this lateral wall on the side with the neighboring seat.

In the second case (access only through the transverse aisle 20), an opening is provided in the lateral walls 14 only on the side adjoining another seat. The passengers located in a seat adjacent to the longitudinal aisle then are better isolated from the various activities of passengers in the longitudinal aisle 16.

Seats are accessed from the transverse aisle 20 by passing between two appurtenances 10. As indicated hereinabove, these appurtenances 10 are of a lesser width than the corresponding seats 8 and each is centered on the plane of symmetry of the corresponding seat. In addition, all the seats in the same row are positioned parallel to the longitudinal axis 2 of the airplane. Thus a space which is used as a passage for accessing the two corresponding seats remains between two appurtenances 10.

The cabin section of FIG. 1 comprises two sets 18 such as the one described hereinabove. These two sets are placed one beside the other. A fifth row, corresponding to a half set, has been added to occupy the space which was still available up to the next emergency exit. The interior space of the cabin thus is optimized for placing the greatest possible number of seats in the space available longitudinally between two successive emergency exits.

The width of each transverse aisle 20 is, of course, sufficient to permit access to the seats which it serves. It advantageously is provided that the width of these transverse aisles likewise is sufficient to allow a cart (commonly called "trolley"), used by the commercial flight personnel for serving meals and drinks to the passengers, to go through. This facilitates the serving of meals and drinks, in particular when the transverse aisles are relatively long (cf. FIGS. 8 to 13), but this also makes it possible to facilitate traffic in the longitudinal aisle 16. In fact, it thus becomes possible to have these trolleys pass one another. It then suffices to move one trolley aside in a transverse aisle and to allow the other to pass in the longitudinal aisle 16. The movement of passengers and commercial flight personnel also is made easier by virtue of these transverse aisles.

In FIGS. 2 to 13, there again are sets 18 of two rows of seats. These Figures correspond to airplanes the fuselage of which has a larger diameter and the rows of seats comprise, according to the scenarios, from five to twelve seats. Each time there also is a longitudinal aisle 16 which divides the rows into "half-rows." In fact, these "half-rows" are not necessarily the same on one and the other side of the longitudinal aisle 16. For reasons of symmetry, it may be preferable to have a more or less identical number of seats on each side of the longitudinal aisle, but a configuration such as that depicted in FIG. 9, with two seats on one side of the longitudinal aisle 16 and six on the other side for each row is entirely conceivable. It even is possible to provide only one seat on one side of longitudinal aisle 16.

Figure 14:
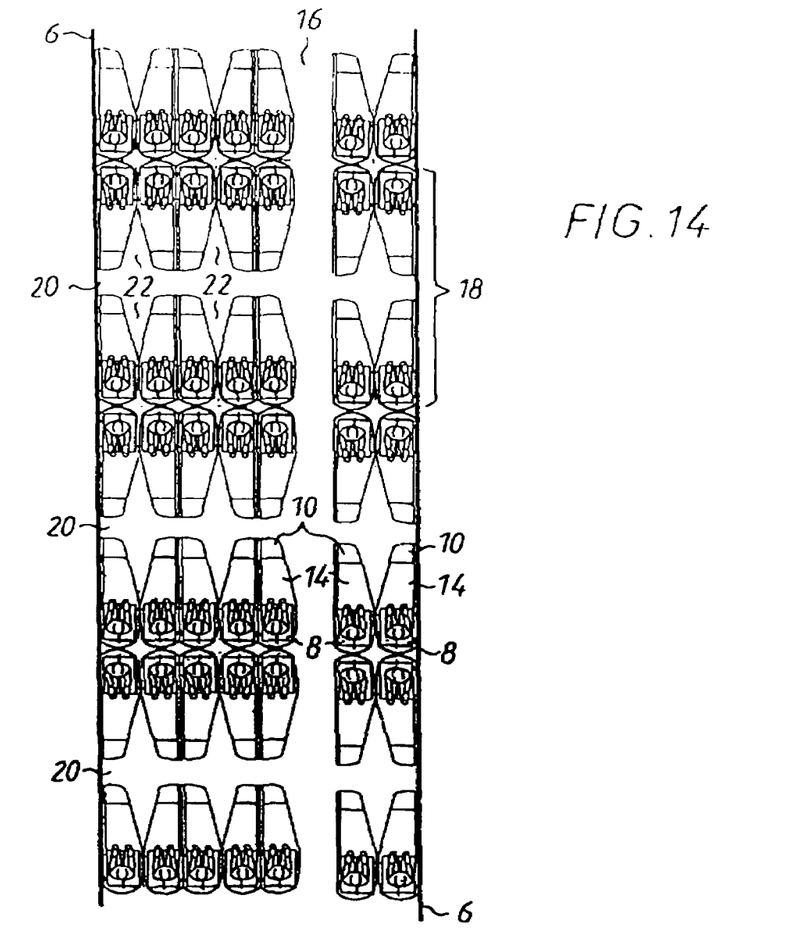
FIG. 14 shows a combination identical to that of FIG. 5 but with other seats.

FIG. 14 shows a variation of embodiment using modules different from those shown in FIGS. 2 to 13. These modules likewise comprise a seat 8, an appurtenance 10 and a lateral wall 14 surrounding the seat 8 and the appurtenance 10. In this embodiment, in comparison with FIGS. 1 to 13, the appurtenance 10 of a module is moved in relation to the seat so as to facilitate access to the seat 8 via the corresponding transverse aisle 20. In this embodiment, the edge of an appurtenance 10 is aligned with an armrest of the seat 8. The lateral wall 14 therefore takes on a form different from that depicted in FIG. 15. This lateral wall no longer is symmetrical (as in FIG. 15), but has on one side a straight edge that extends parallel to the longitudinal aisle 16 and on the other side a sloping edge which diverges in relation to the right edge of the appurtenance 10 toward the seat 8.

Thus two types of modules are implemented: a first type for which the straight edge of the lateral wall 14 is to the right of a passenger sitting in the seat 8 and a second type of module for which the straight edge is left of a passenger sitting in the corresponding seat 8.

In FIG. 14, the modules are arranged in the following manner. In a "half-row," a straight edge of the module is placed along the cabin wall 6. Then the other modules of the "half-row" are arranged, alternating the type of module. Two neighboring modules therefore are always of different types. In this manner, V-shaped accesses 22 are created, each access 22 serving two seats 8. In comparison with the accesses to the seats of FIGS. 1 to 13, it is noted that the width of the passage is greater and passing through to go back to or leave one's seat thus is easier.

With regard to the opening made in the lateral wall 14 in order to access the seat 8, it may be assumed here, for example, that all the sloping edges of the lateral walls 14, and only those, are equipped with an opening for access to the corresponding seat 8. Of course, it will be possible to provide, in certain configurations, an opening in the straight side of the lateral wall. Thus, for example, a system can be provided with two openings and a door as depicted in FIG. 15. In the basic configuration, the door then closes the opening implemented in the straight side of the corresponding lateral wall. Then when two people are traveling together, they can settle into two neighboring modules that are in contact with one another by way of their straight sides. Once they are settled, they each can move the door closing the opening on the straight side of their module in order to close the opening on the sloping side of their module. They thus create a dual module isolated from the other passengers.

In all these formats, it is noted that it is possible to place a large number of seats in a given space. This is explained in particular by the presence of a single longitudinal aisle. For a given cabin section, it is possible to place as many modules as described hereinabove and allowing a passenger to travel lying down, as merely reclining seats not making it possible to assume a lying-down position and arranged in standard manner, that is, in rows, all seats being positioned in the same direction and with longitudinal aisles, to prevent the passengers who are moving about from having to apologize to one (or more) neighboring passenger(s). This invention then makes it possible, in comparison with the aircraft of the prior art, either to have the same number of passengers travel, but in greater comfort, or a greater number of passengers with the same comfort. With small airplanes (FIGS. 1 to 4), the gain in passengers, traveling under the same comfort conditions, for the same cabin section, is less significant than for airplanes of larger size (FIGS. 8 to 13).

All the configurations depicted have the advantage of facilitating traffic on board the airplane. Serving meals and drinks can be performed more easily and in most cases it is possible to avoid bottlenecks.

The configurations depicted in the drawing also have the advantage of being able to be adapted to all types of existing and future airplanes. The number of seats in each row is deduced from the width that one wishes to allot to the seats and from the minimum width of the longitudinal aisle. In addition, it is possible to easily combine different comfort classes. The same longitudinal aisle thus can serve transverse rows which do not all have the same number of seats. The same longitudinal aisle thus can serve first-class seats in one portion of the plane, then business-class seats and finally the economy-class seats.

This invention is not limited to the embodiments described hereinabove by way of nonrestrictive examples, but also relates to all the variations accessible to the person skilled in the art in the context of the claims hereinbelow.

The invention claimed is:

1. A set of aircraft seats in an aircraft cabin comprising:
   two rows of seats arranged transversely in relation to a longitudinal axis of the aircraft cabin, a single longitudinal aisle allowing access to both of the transverse rows, and
   an appurtenance combined with and immovable with respect to each seat arranged facing and at a distance from the seat, with a lesser width than that of the seat,
   wherein the two transverse rows are arranged facing one another, a single transverse aisle separates the two rows of seats and allows access to both of the transverse rows and in each row of seats, at least one seat is located on one side of the longitudinal aisle, and at least two seats are located on the other side of the longitudinal aisle.

2. A set of aircraft seats according to claim 1, wherein each seat is positioned parallel to an axis of the longitudinal aisle.

3. A set of aircraft seats according to claim 1, wherein the appurtenance comprises a support surface arranged at a height substantially equal to that of a sitting surface of the seat, within about ten centimeters.

4. A set of aircraft seats according to claim 1, wherein each seat cooperates with the appurtenance arranged facing it to make a bedding surface.

5. A set of aircraft seats according to claim 1, wherein each seat comprises a sitting surface, a back, and two armrests, and the seat is surrounded on its back and armrest side by a lateral wall serving as a divider with a neighboring seat.

6. A set of aircraft seats according to claim 1, wherein each seat comprises a sitting surface, a back, and two armrests, and a lateral wall surrounds each seat on its back and armrest side, as well as the appurtenance combined with the seat, and at least one opening is provided in the lateral wall for accessing the seat.

7. A set of aircraft seats according to claim 6, wherein each appurtenance is substantially centered on the longitudinal axis of the corresponding seat, and each lateral wall has an opening between the seat and the appurtenance on each of its sides located facing a neighboring seat.

8. A set of aircraft seats according to claim 7, wherein each lateral wall has two openings of identical width, one on each side of the corresponding seat, and a door is provided to close one of the two openings.

9. A set of aircraft seats according to claim 6, wherein the lateral wall comprises a first side substantially parallel to the longitudinal aisle, the seat and the appurtenance are arranged against this first side, wherein a second side of the wall, opposite the first side, widens out in relation to this first side starting from the appurtenance, and wherein the opening for accessing the seat is implemented in the second side.

10. A set of aircraft seats according to claim 9, comprising a first type of seat for which the first side of the lateral wall, that is substantially parallel to the longitudinal aisle, is to the right of a passenger sitting in the seat, and a second type of seat for which the first side of the wall is left of a passenger sitting in the seat, wherein the seats are arranged so that for the seats near a cabin wall, the first side of the corresponding wall faces the cabin wall and, in a transverse row of seats, between the cabin wall and the longitudinal aisle, the types of seats alternate from one seat to the other.

11. An aircraft, comprising at least one set of seats according to claim 1.

12. The set of aircraft seats according to claim 1, wherein the two transverse rows facing one another are arranged at a same vertical level.

13. The set of aircraft seats according to claim 1, wherein an appurtenance is arranged in front of every seat.

14. The set of aircraft seats according to claim 1, further comprising a third row of seats arranged back-to-back with one of said two rows of seats.

15. The set of aircraft seats according to claim 1, wherein, in each row of seats, at least two seats are located on one side of the longitudinal aisle, and at least three seats are located on the other side of the longitudinal aisle.

16. The set of aircraft seats according to claim 1, wherein, in each row of seats, at least two seats are located on one side of the longitudinal aisle, and at least four seats are located on the other side of the longitudinal aisle.

17. The set of aircraft seats according to claim 1, wherein, in each row of seats, at least two seats are located on one side of the longitudinal aisle, and at least five seats are located on the other side of the longitudinal aisle.

18. The set of aircraft seats according to claim 1, wherein, in each row of seats, at least three seats are located on one side of the longitudinal aisle, and at least four seats are located on the other side of the longitudinal aisle.

19. The set of aircraft seats according to claim 1, wherein, in each row of seats, at least three seats are located on one side of the longitudinal aisle, and at least five seats are located on the other side of the longitudinal aisle.

20. The set of aircraft seats according to claim 1, wherein, in each row of seats, at least four seats are located on one side of the longitudinal aisle, and at least four seats are located on the other side of the longitudinal aisle.

21. A set of aircraft seats according to claim 1, wherein the transverse aisle separates appurtenances of the seats of the two rows.

22. A set of aircraft seats in an aircraft cabin comprising:
   two rows of seats arranged transversely in relation to a longitudinal axis of the aircraft cabin, a single longitudinal aisle allowing access to both of the transverse rows, and
   an appurtenance combined with each seat arranged facing and at a distance from the seat, with a lesser width than that of the seat, each appurtenance arranged to support each corresponding seat when the seat is in a reclined position such that each seat in the reclined position forms a sleeping surface supported at one end by the appurtenance, wherein the two transverse rows are arranged facing one another, a single transverse aisle separates the two rows of seats and allows access to both of the transverse rows and in each row of seats, at least one seat is located on one side of the longitudinal aisle, and at least two seats are located on the other side of the longitudinal aisle.

* * * * *